US006599585B2

(12) United States Patent
Blacker, Jr. et al.

(10) Patent No.: US 6,599,585 B2
(45) Date of Patent: Jul. 29, 2003

(54) UV CURING SYSTEM FOR HEAT SENSITIVE SUBSTANCES AND PROCESS

(75) Inventors: Allen P. Blacker, Jr., Hoffman Estates, IL (US); Thomas Becker, Valparasio, IN (US); Kevin McKay, Romeoville, IL (US); Simon N. Whittle, Shorewood, IL (US)

(73) Assignee: Aetek UV Systems, Romeoville, IL (US)

( * ) Notice: Subject to any disclaimer, the term of this patent is extended or adjusted under 35 U.S.C. 154(b) by 0 days.

(21) Appl. No.: 10/164,620

(22) Filed: Jun. 10, 2002

(65) Prior Publication Data

US 2003/0039711 A1 Feb. 27, 2003

Related U.S. Application Data

(60) Provisional application No. 60/296,476, filed on Jun. 8, 2001.

(51) Int. Cl.[7] .................................................... C08F 2/48

(52) U.S. Cl. ......................... 427/508; 118/68; 118/506; 118/641; 427/385.5; 427/444; 427/558; 427/559; 427/595

(58) Field of Search .......................... 118/68, 506, 641; 427/508, 558, 559, 595, 385.5, 444

(56) References Cited

U.S. PATENT DOCUMENTS 4,048,490 A 9/1977 Troue
4,563,589 A 1/1986 Scheffer
4,644,899 A 2/1987 Glaus
5,667,850 A 9/1997 Gaven et al.

*Primary Examiner*—Bernard Pianalto
(74) *Attorney, Agent, or Firm*—Babcock IP, LLC

(57) ABSTRACT

A UV curing system includes a light source, which produces UV light and non-useful light (heat energy), a shade member having a lamp-side surface that reflects light and provides thermal insulation to the target substance, and a housing having an internal reflecting surface. The shade member is situated between the light source and the target substance so that all, or most, light from the light source does not directly strike the target substance. The housing is situated on the opposite side of the light source from the barrier and partially encloses the light source. The shape of the internal reflecting surface of the housing, the shape of the shade member, and the location of the internal reflecting surface of the housing, the shade member and the light source with respect to each other are selected so that at least some of the UV light emitted by the light source is reflected onto the target substance after striking the shade member and/or the internal reflecting surface of the housing and non-useful light emitted by the light source is attenuated (by path length increase, physical blockage, insulating properties of the shade member and/or dichroic filter action) thereby keeping the target substance cooler during a curing process than it would otherwise have been without the presence of the shade member.

10 Claims, 3 Drawing Sheets

UV CURING SYSTEM FOR HEAT SENSITIVE SUBSTANCES AND PROCESS

CROSS REFERENCE TO RELATED APPLICATIONS

This application claims the benefit of the filing date of U.S. Provisional Application Ser. No. 60/296,476, filed Jun. 8, 2001.

BACKGROUND OF THE INVENTION

The present invention relates to systems and processes for ultraviolet (UV) curing of materials. In particular, the present invention relates to a device and process that allows for UV curing of materials at a lower substrate temperature than that allowed by conventional systems and processes.

DESCRIPTION OF THE RELATED ART

In UV curing of materials, such as, for example, photopolymerizable organic materials, a problem that arises is that the UV source used in the process may generate a large amount of heat, which arises from the UV light itself as well as from non-useful light of other frequencies, including infrared (IR) radiation, which can adversely affect the substance being cured. Excess temperatures may then damage or destroy heat-sensitive materials, such as the substance being cured or a support material (such as paper, plastic, foil, etc.) on which the substance is being cured.

Efforts to reduce the amount of non-useful heat-producing light that impinges on a target substrate while maintaining an acceptable level of UV have included the use of indirect illumination, hot mirrors and dichroic coatings. For example, U.S. Pat. No. 4,644,899 to Glaus discloses a curing device wherein rays from a light source impinge on a mirror that is partially transmitting and set at an angle with respect to the axis of the light beam, so that IR light rays pass directly through the mirror to a cooling system and UV light rays are deflected towards the substrate to be cured. U.S. Pat. No. 4,048,490 to Troue discloses an apparatus having an arrangement of dichroic filter surfaces. Light from a UV light source is deflected off one of the dichroic filter surfaces and is directed toward the substrate to be cured. A cusp-like member is mounted in the path of the light beam to ensure that all of the light rays from the light source are deflected off a dichroic surface only once. U.S. Pat. No. 4,563,589 to Scheffer discloses an ultraviolet curing lamp device that includes a blocker tube located between the ultraviolet light source and an ultraviolet light permeable quartz plate window through which the ultraviolet light exits. The blocker tube reflects ultraviolet, visible and infrared light.

Many of the suggested solutions to lowering the temperature of an ultraviolet curing process add considerable complexity and expense to the ultraviolet curing apparatus. For example, quartz plates and large surface area dichroic coatings can be very expensive.

SUMMARY OF THE INVENTION

The present invention is a UV curing system and process for curing a target substance which overcomes the aforementioned problems of the prior art. In particular, the UV curing system includes a light source, which produces useful UV light, as well as other unwanted wavelengths of light (each of which can produce unwanted heat), a shade member having a lamp-side surface which performs dichroically—absorbing heat producing light that is not within the range of useful UV light wavelengths, and reflecting useful UV light wavelengths, and a housing having another dichroic (UV reflect, IR pass) coated surface. As used herein, "useful" UV light refers to UV light of a wavelength that cures the target substance. The shade member is situated between the light source and the target substance so that some, or all of the light from the light source does not directly strike the target substance. The housing is situated on the opposite side of the light source from the target and partially encloses the light source. The shape of the reflecting surface of the housing, the shape of the shade member, and the location of the internal reflecting surface of the housing, the shade member and the light source with respect to each other are selected so that (1) at least some of the UV light that leaves the light source and travels in a direction in which it does not strike the shade member strikes the dichroic reflecting surface of the housing and is reflected onto the target substance and (2) at least some of the UV light that leaves the light source and travels in a direction in which it strikes the shade member is reflected from the lamp-side of the shade member onto the dichroic, reflecting surface of the housing, from which it is reflected onto the target substance. And since the materials used to fabricate the shade member prevent the target-side surface of the shade member from getting hot and re-radiating heat energy to the target substance, and the physical presence of the shade blocks all, or most, direct illumination (light/heat) from the lamp, the target surface is thereby kept cooler during a curing process than it would otherwise have been without the presence of the shade member.

In a preferred embodiment, the shade member possesses thermal insulating properties created by certain materials such as ceramic or quartz, which may or may not be coated with one of a variety of coatings applied to increase the shade's lamp-side to target-side temperature ratio. An example of a ceramic material which may be used is alumina.

In another preferred embodiment, the shade member may have at least one internal conduit that may be filled with a heat conducting material that conducts heat to heat sinks which are not located near the target substance. A metallic conductor may also serve to provide mechanical support for the material from which the shade is fabricated.

The invention further relates to methods of curing UV-curable substances by providing a UV curing system as described above and activating the UV light source so that the UV-curable substance is exposed to UV light from the UV curing system.

BRIEF DESCRIPTION OF THE DRAWINGS

Like reference numerals identify like parts throughout the drawings.

DESCRIPTION OF THE PREFERRED EMBODIMENTS

Figure 1:
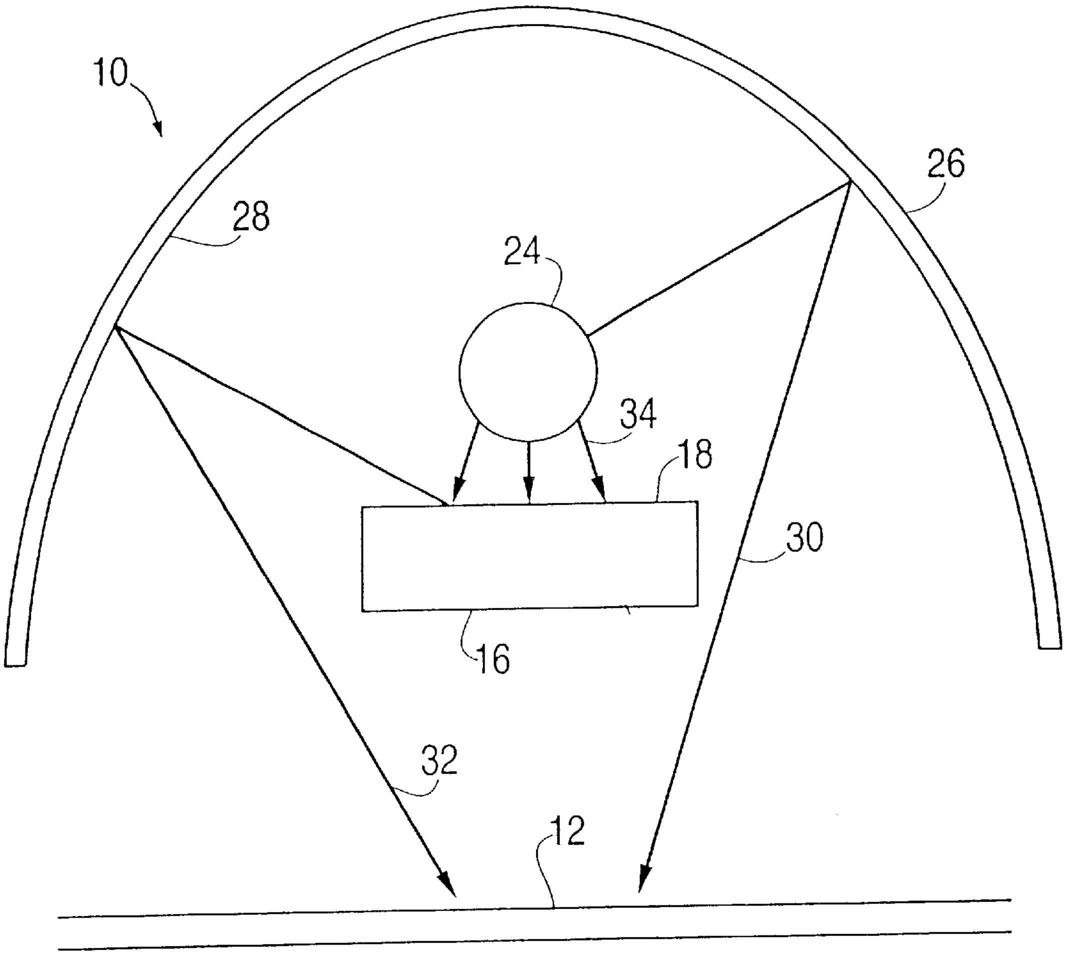
FIG. 1 illustrates a schematic cross-sectional view of a UV curing system in accordance with one embodiment of the present invention.
Figure 2A:
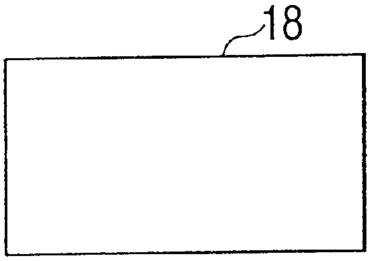
FIGS. 2A–2F illustrate schematic cross-sectional view of various configurations for the shade member.
Figure 2B:
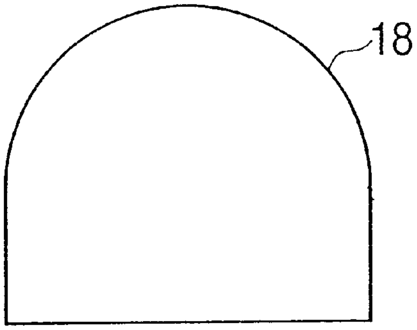
Figure 2C:
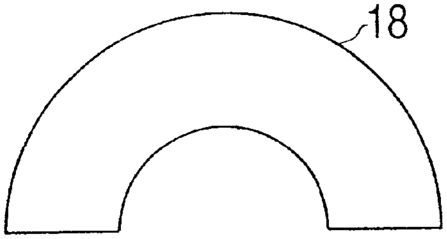
Figure 2D:
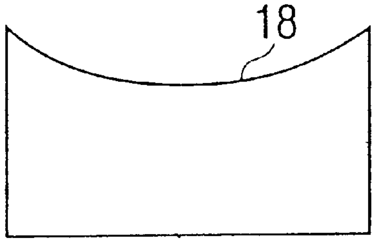
Figure 2E:
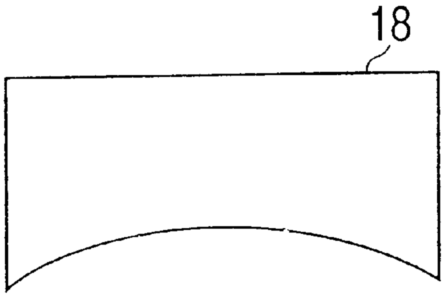
Figure 2F:
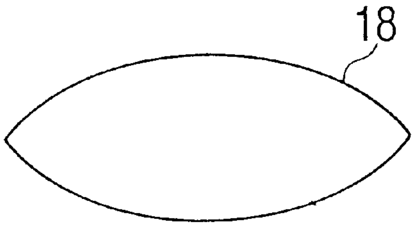

FIG. 1 illustrates a first embodiment of a UV curing system 10 for curing a target substance 12. The system includes a light source 24 that produces UV light and undesirable IR light. The UV light source 24 may be, without limitation, a microwave excited light source or an arc excited UV source each of conventional construction.

A shade member 16 is situated between the light source 24 and the target substance 12 so that light from the light source does not directly strike the target substance or is at least partially blocked from striking the target substance. The shade member 16 thus forms a shade that shields the target substance from all, or most, direct beams of light from the lamp. The shade member 16 has a lamp-side surface 18 (that is, a surface that faces the light source) that reflects UV and which can act to insulate the target-side surface from lamp-side temperatures. A housing 26 having an internal dichroic reflecting surface, the shape of the shade member, the materials from which the shade member is fabricated, the location of the internal reflecting surface of the housing, the shade member and the light source with respect to each other are selected so that (1) at least some of the UV light (shown as 30) that leaves the light source 24 and travels in a direction in which it does not strike the shade member strikes the internal dichroic reflecting surface 28 of the housing 26 and is reflected onto the target substance 12. At least some of the UV light (shown as 32 that leaves the light source 24 and travels in a direction in which it strikes the shade member 16 is reflected from the lamp-side surface 18 of the shade member 16 onto the internal dichroic reflecting surface 28 of the housing 26, from which it is reflected onto the target substance 12. Non-useful light that strikes the shade member 16 is attenuated in several ways, while useful UV light is minimally attenuated before arriving at the target substance. Multiple reflections of UV light may occur before the UV light reaches the target substance.

Typically, dichroic surfaces are not 100% efficient in absorption or reflection. Therefore some small amount of UV light will be absorbed and some small amount of unwanted, non-useful light may be reflected from the internal reflecting surface of the housing. However, a UV curing system can readily be constructed according to the present invention so that a sufficient amount of UV light reaches the target substance to effect curing and a sufficient amount of unwanted, heat producing light is absorbed to provide a reduced operating temperature at the target substance.

Figure 3:
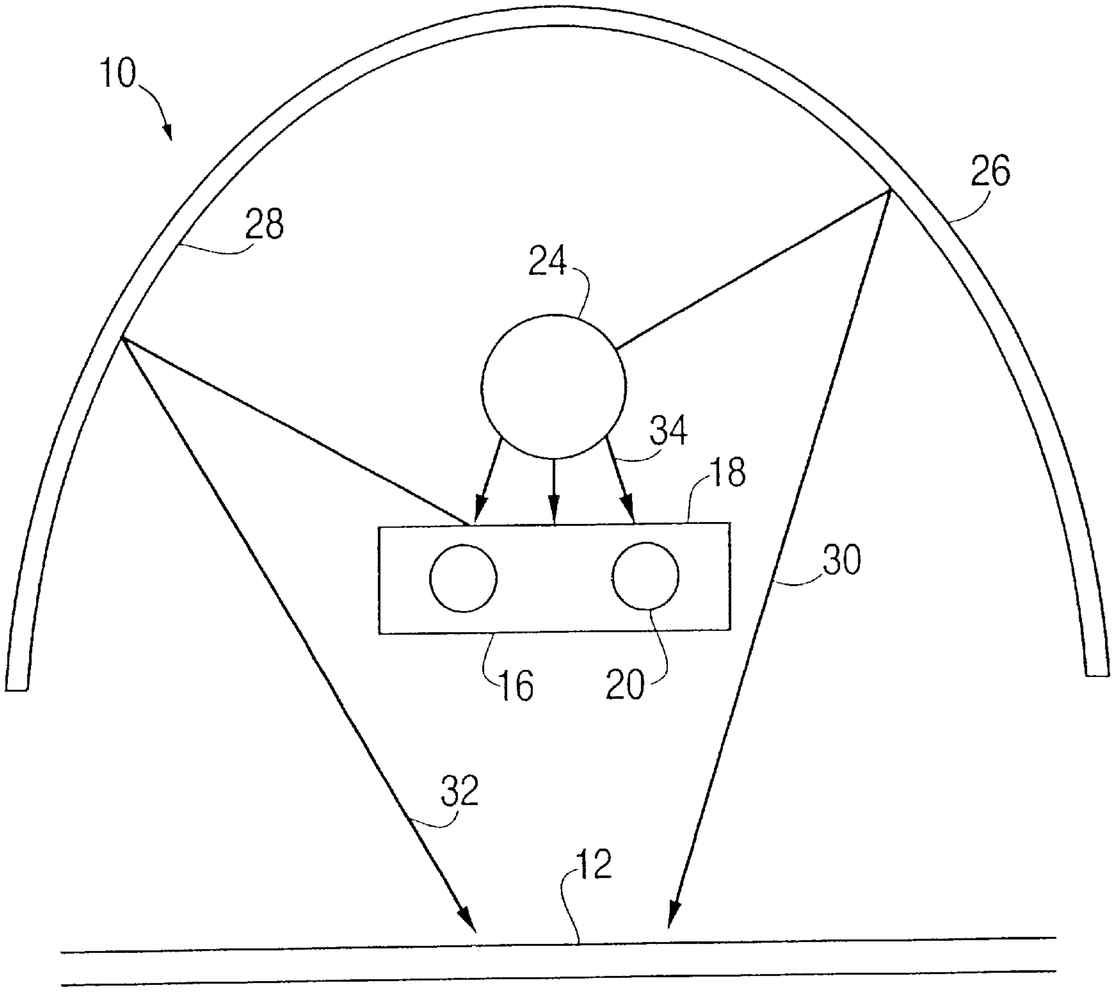
FIG. 3 illustrates a schematic cross-sectional view of a UV curing system in accordance with another embodiment of the present invention.

Preferably, the shade member is made of a material that is a very good thermal insulator so that during the operation of the UV curing system, the target side of the shade member remains cooler than the lamp side of the shade member. As shown in FIG. 3, the shade member may contain one or more internal conduits 20 that are fluidly connected with a source of cooling fluid, such as air, so that the shade member is kept cool by the circulation of cooling fluid through the one or more internal conduits.

The curing system of the first embodiment of the present invention may be created by mounting a shade member into a conventional UV curing system having a UV light source and a housing. The invention is particularly suitable for UV curing systems that are capable of producing an excess of UV light, that is, systems which, in an unaltered state, produce an amount of UV light that is greater than what is needed for high speed curing. By adding a shade member to such a UV curing system to create a UV curing system of the present invention, the operating temperature at the location of the target substance may be greatly reduced without sacrificing the ability to effect rapid UV curing.

The curing system may also be constructed by designing the size, shape and reflectivity of the housing and the shade member and designing the location of light source, shade member, housing and target substance so as to maximize the amount of UV light that strikes the target substance and minimize the amount of IR light that strikes the target substance. For example, either the internal reflecting surface 28 of the housing 26 or the outer surface 18 of the shade member 16, or both, may be made of a dichroic material. The shade member 16 may have various shapes, illustrated, but not limited by, the shapes shown in FIGS. 2A–2F. In particular, the surface of the shade member facing the light source may be flat, concave or convex. The housing 26 preferably has an elliptical shape.

While the invention has been described in terms of preferred embodiments, it should be understood that numerous modifications may be made thereto without departing from the spirit and the scope of the present invention.

What is claimed is:

1. A UV curing system for curing a target substance, the system comprising:

a light source for producing UV light, the light source also producing non-useful light of frequencies other than UV, a shade member having a lamp-side surface that is situated between the light source and the target substance so that light from the light source does not directly strike the target substance, wherein the shade member performs dichroically to absorb heat-producing light that is not in the range of useful UV light, and wherein the shade member is made of a material with thermally insulating properties, a housing having an internal dichroic reflecting surface, wherein the shape of the internal dichroic reflecting surface of the housing, the shape of the shade member, and the location of the internal reflecting surface of the housing, the shade member and the light source with respect to each other are selected so that (1) at least some of the UV light that leaves the light source and travels in a direction in which it does not strike the shade member strikes the internal reflecting surface of the housing and is reflected onto the target substance and (2) at least some of the UV light that leaves the light source and travels in a direction in which it strikes the shade member is reflected from the outer surface of the shade member onto the internal reflecting surface of the housing, from which it is reflected onto the target substance.

2. The UV curing system of claim 1 wherein the shade member has at least one internal conduit that is fluidly connected with a source of cooling fluid.

3. The UV curing system of claim 2 wherein the cooling fluid is air.

4. The UV curing system of claim 1 wherein the shade member is made from a material that allows for thermal conduction to eliminate heat and wherein the shade member is connected to a heat sink.

5. The UV curing system of claim 1 wherein the surface of the shade member that faces the light source is flat.

6. The UV curing system of claim 1 wherein the portion of the shade member that faces the light source is concave.

7. The UV curing system of claim 1 wherein the portion of the shade member that faces the light source is convex.

8. The UV curing system of claim 1 wherein the shade member is made of a ceramic or quartz.

9. The UV curing system of claim 1 wherein the shade member is made of alumina.

10. A process for curing a target substance that is curable by exposure to UV light, the process comprising the steps of providing a UV curing system, the UV curing system comprising:

a light source for producing UV light, the light source also producing non-useful light of frequencies other than UV, a shade member having a lamp-side surface that is situated between the light source and the target substance so that light from the light source does not directly strike the target substance, wherein the shade member performs dichroically to absorb heat-producing light that is not in the range of useful UV light, and wherein the shade member is made of a material with thermally insulating properties, a housing having an internal dichroic reflecting surface, wherein the shape of the internal dichroic reflecting surface of the housing, the shape of the shade member, and the location of the internal reflecting surface of the housing, the shade member and the light source with respect to each other are selected so that (1) at least some of the UV light that leaves the light source and travels in a direction in which it does not strike the shade member strikes the internal reflecting surface of the housing and is reflected onto the target substance and (2) at least some of the UV light that leaves the light source and travels in a direction in which it strikes the shade member is reflected from the outer surface of the shade member onto the internal reflecting surface of the housing, from which it is reflected onto the target substance, and activating the light source so that UV light strikes the target substance.

* * * * *